United States Patent [19]

Brydon et al.

[11] Patent Number: 5,273,815
[45] Date of Patent: Dec. 28, 1993

[54] THERMAL CONTROL AND ELECTROSTATIC DISCHARGE LAMINATE

[75] Inventors: Louis B. Brydon, San Carlos; Samuel R. Moore, Palo Alto; James D. Holbery, Pine Grove, all of Calif.

[73] Assignee: Space Systems/Loral, Inc., Palo Alto, Calif.

[21] Appl. No.: 750,327

[22] Filed: Aug. 27, 1991

[51] Int. Cl.⁵ .................... B32B 27/00; B32B 9/04; B32B 15/08; H01Q 15/24
[52] U.S. Cl. .................................. 428/266; 428/421; 428/446; 428/458; 428/688; 428/247; 428/267; 428/255; 343/DIG. 2; 343/872; 343/897; 343/909
[58] Field of Search .............. 428/138, 266, 285, 287, 428/421, 458, 688, 446; 343/872, 897, DIG. 2, 909

[56] References Cited

U.S. PATENT DOCUMENTS 4,166,876  9/1979  Chiba et al. .................. 428/421
5,017,940  5/1991  Rigollet .................. 343/897

OTHER PUBLICATIONS

Clark et al—Thermo-Mechanical Design & Analysis System . . . Reflector, AIAA-82-0869, Jun., 1982.

*Primary Examiner*—George F. Lesmes
*Assistant Examiner*—Kathryne E. Shelborne
*Attorney, Agent, or Firm*—Kenneth M. Kaslo; Edward J. Radlo

[57] ABSTRACT

A laminate (10) which is transparent to radio frequency emissions, useful as a thermal control and electrostatic discharge surface, for example for protecting spacecraft antenna hardware, comprises a conductive layer (12) for dissipating electrostatic charges and a thermal control layer (24) for reflecting thermal radiation and reducing the effect of temperature variations on one side of the laminate on the region on the other side of the laminate. In a preferred embodiment, the conductive layer (12) preferably comprises a semiconductor, such as germanium. The thermal control layer (24) comprises a film layer (14), for example of polyimide film, a mesh layer (16), for example of polyamide fabric, attached to the film layer (14), and a thermally reflective coating (20), applied to the mesh layer (16) for aiding the conductive layer (12) and thermal control layer (24) in reflecting radiation.

13 Claims, 1 Drawing Sheet

THERMAL CONTROL AND ELECTROSTATIC DISCHARGE LAMINATE

BACKGROUND OF THE INVENTION

1. Field of the Invention

The present invention relates to a laminate that is transparent to a wide range of radio frequencies, which is useful, for example, as a protective covering for spacecraft hardware to maintain thermal stability and provide electrostatic charge dissipation.

2. Description of Related Art

Various types of equipment, such as communications equipment, require protection when placed in environments which are electrically charged and/or contain great thermal variations to avoid damage or distortion of the equipment. For example, the space environment subjects spacecraft exterior hardware, such as antennas, to great extremes in temperature and high fluxes of charged particles, or plasma. Great variations in temperature over short periods of time can cause mechanical distortions in the exterior hardware. Protecting communications hardware from extreme environments, such as space, presents a special problem because the materials normally used to protect spacecraft hardware interfere with radio signal transmissions. Although protection from the hostile environment is a primary concern, minimization of the cost of the material and its total weight are competing concerns. Thus, there is a need for a strong material that is capable of providing electrical and thermal protection, and yet is lightweight, relatively inexpensive, and transparent to a wide range of radio frequencies.

Various materials are shown in the prior art which meet some of these criteria, but none meet all of them. For example, U.S. Pat. No. 4,816,328 to Saville, et al. discloses a laminate useful as a cover for cleaned aerospace equipment during retrofitting, shipping, and storing. However, this laminate is not adapted for use in the highly electrostatically charged space environment, nor as a thermal control surface.

U.S. Pat. No. 4,810,563 to DeGree, et al. discloses a laminate useful as a mounting base or chassis attachment member for mounting solid state devices. The laminate of DeGree has a metallic, electrically conductive layer and thus is not radio frequency transparent as is the laminate of the present invention.

U.S. Pat. No. 4,438,168 to Testard discloses a heat shield useful as thermal insulation for cryogenic instruments, but the heat shield has no electrostatic charge dissipation properties.

U.S. Pat No. 4,329,73 to Muelenberg, Jr. discloses an electrostatic charge dissipative layer comprising a dielectric material overlying a metallic layer with a plurality of aperture points exposed through the film. This dielectric and metallic film is not radio frequency transparent.

"Thermo-Mechanical Design and Analysis System for the Hughes 76 Inch Parabolic Antenna Reflector," by S. C. Clark and G. E. Allen, Sr., paper AIAA-82-0864, discloses an electrostatic discharge laminate useful as a thermal control surface which is radio frequency transparent for certain radio frequencies. However, the laminate comprises vacuum deposited aluminum that allows passage of only certain ranges of radio frequencies. The laminate of the present invention is easier to fabricate, radio frequency transparent over a broader range of frequencies, and may be more easily used in fabricating various stiffened protective structures for spacecraft exterior hardware.

DISCLOSURE OF THE INVENTION

To accomplish these and other objects, the present invention provides a laminate for providing thermal and electrostatic protection which is transparent to a wide range of radio frequencies, comprising a conducting layer for safely reducing charge build-up and a contiguous thermal control layer attached to the conducting layer for aiding the conducting layer in reflecting thermal radiation and reducing the effect of temperature variations on one side of the laminate on the region on the other side of the laminate.

DETAILED DESCRIPTION OF THE PREFERRED EMBODIMENTS

Figure 1:
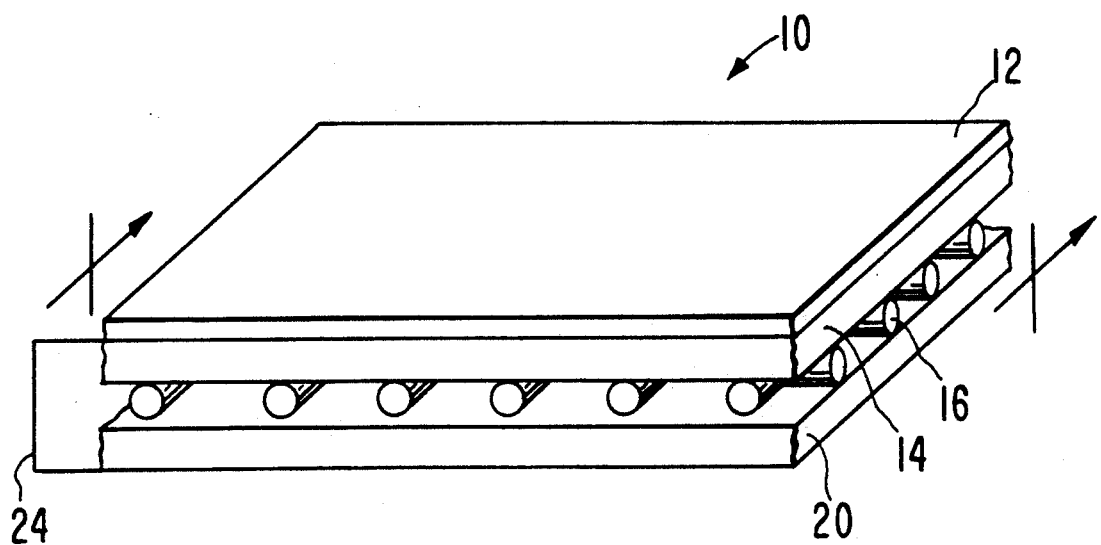
FIG. 1 is a perspective view of a preferred embodiment of a laminate of the present invention.
Figure 2:
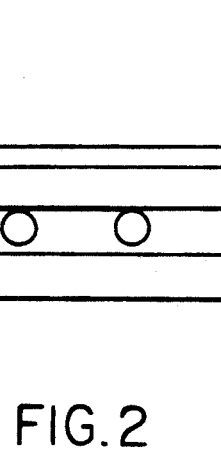
FIG. 2 is a cross-sectional view of the laminate of FIG. 1 taken along line 2—2 in FIG. 1.

Referring now to FIGS. 1 and 2, a preferred embodiment of a laminate 10 of the present invention comprises a conducting layer 12 and a thermal control layer 24. The conducting layer 12 is preferably a semiconductor, and in the preferred embodiment is germanium. Thermal control layer 24 comprises a film layer 14 abutting the conducting layer 12, a mesh layer 16 attached to the film layer 14, and a thermally reflective coating 20. In the preferred embodiment, mesh layer 16 is an epoxy impregnated woven polyimide fabric, and thermally reflective coating 20 is a polyvinylfluoride (PVF) film, such as Tedlar ® (marketed by DuPont).

Since the components are transparent to radio frequency emissions, laminate 10 of the present invention is radio frequency transparent over a wide range of communications frequencies, including those commonly used in space applications, such as four to sixteen gigahertz. If an electrostatic charge accumulates on laminate 10, it is discharged by the charges migrating across the conducting layer 12 and then through a conductor (not shown) which is connected to the conducting layer 12 and grounded to a point of low electrostatic potential. Since electrostatic charges migrating through the conducting layer 12 and the conductor are grounded, damaging arcing electrostatic discharges from one point on the spacecraft to a point of lower electrostatic potential on nearby hardware may be avoided.

Laminate 10 is also a thermal control surface that reflects a high percentage of thermal energy directed at the exterior hardware of, for example a spacecraft, from external sources, and reflects radiation generated by the exterior hardware when the exterior hardware is directed at deep space. In addition, laminate 10 evens the temperature gradients across the exterior hardware and reduces the temperature rate of change when the exterior hardware is exposed to temperature extremes of either hot or cold, thus avoiding physical distortions in the exterior hardware.

Laminate 10 may be stiffened and formed into various shapes. Due to the material being radio frequency transparent independent of shape, the material can easily be used in a variety of applications. For example, laminate 10 may be used to form a radome for a spacecraft antenna reflector.

When laminate 10 is so used as a cover for spacecraft antenna reflectors, it reflects external (solar) heat, and maintains mostly uniform temperatures across the antenna reflector by reflecting internal radiation back onto the antenna reflector. Internal radiation reflection reduces extreme temperatures and temperature gradients across the antenna reflector, even during partial shading. When the reflector faces deep space, the thermally reflective coating 20 reflects emitted thermal energy from the antenna reflector such that the rate at which reflector temperatures fall is significantly reduced.

The conducting layer 12 serves as the layer upon which charges from the environment, such as space, accumulate and may be dissipated to a point of low potential, or ground. The conducting layer 12 also reflects thermal radiation from sources located on that side of the laminate. The conducting layer 12 must be radio frequency transparent for the radio frequencies desired to be transmitted through laminate 10. The conducting layer 12 of laminate 10 abuts to the thermal control layer 24. The thickness of the conducting layer 12 is chosen to reduce its thermal absorption and maintain sufficient electrical conductivity so that the surface may still serve the electrostatic dissipative function. In the preferred embodiment, the conducting layer 12 is germanium which is, for example, vacuum deposited on the thermal control layer 24 to a uniform thickness in the range of 500 to 2500 angstroms.

Thermal control layer 24 is also transparent to a wide range of radio frequencies and acts as a thermal gradient dampener and as a thermal reflector. Thermal control layer 24 aids conducting layer 12 in reflecting radiation when laminate 10 is exposed to direct heating. Thermal control layer 24 also reflects radiation emitted by the hardware which it covers to reduce the rate at which the exterior hardware temperature drops, thus avoiding hardware distortion resulting from rapid temperature variation.

Thermal control layer 24 includes a thermally reflective coating 20, preferably a silica-based paint or PVF film, such as the PVF film marketed by DuPont under the trademark Tedlar ®. Thermally reflective coating 20 is preferably white for maximizing internal radiation reflectivity. For example, a thermally reflective coating 20 such as NASA approved S-13 GLO white, silica-based paint may be used. Other thermally reflective coating materials with similar thermal and electrical properties may be used in place of silica-based paint and PVF films like Tedlar ®.

In the preferred embodiment of the present invention the thermal control layer 24 also includes a film layer 14, acting both as a substrate for the conducting layer 12 and a carrier for the reflective coating 20. The film layer 14 thus supports the laminate and in effect holds it together. The film layer 14 is preferably a polyimide film which possesses the properties of being able to withstand high temperature while maintaining its physical integrity and original shape, and which is transparent to radio frequency electromagnetic radiation. For example, such a polyimide film is marketed by DuPont under the trademark Kapton ®. Other materials with similar thermal and electrical properties may be used in place of polyimide film.

In the preferred embodiment, the thermal control layer also includes a mesh layer 16 attached to the side of the film layer 14 opposite the conducting layer 12, to strengthen laminate 10. Mesh layer 16 is preferably made of a non-flammable polyamide fabric, such as the non-flammable polyamide fabric marketed by DuPont under the trade name Nomex ®. Mesh layer 16 may be a woven, knitted, or non-knitted polyamide fabric, which includes the woven polyamide fabric marketed by DuPont under the trademark Kevlar ®. When the polyamide fabric is impregnated with epoxy which is then cured, additional stiffness and strength is added to laminate 10. Other similar materials with similar thermal and electrical properties to polyamide fabric may be used.

In the preferred embodiment, the germanium layer is about 1100 angstroms thick, the Kapton ® film which serves as film layer 14 is about 1 mil thick, the Nomex ® fabric used as the mesh layer 16 is 4 to 5 mils thick, and the Tedlar ® film used as thermally reflective coating 20 is about 1 mil thick. With this construction, the laminate 10 allows over 99% of the radio frequency emissions to pass, while only allowing 4-5% of the light through. In general, the thicker the layers, the less light passes through and the less radio frequency transparent the laminate 10 becomes. Thus, these dimensions can be increased to reduce the light transmission of the laminate 10, at the cost of also decreasing the amount of radio frequency emissions which pass through the laminate.

Alternative embodiments of thermal control layer 24 may be made of thermally reflective coating 20 in combination with either film layer 14 or mesh layer 16, or other layers which provide sufficient structural support for conducting layer 12 and thermally reflective coating 20 and which are transparent to radio frequency emissions. Also, thermal control layer 24 ideally would be made of only a material which combines the thermal reflectivity of thermally reflective coating 20 with the strength of film layer 24; however, no such materials are presently known.

The above description is included to illustrate the preferred embodiments and is not meant to limit the scope of invention. The scope of the invention is to be limited only by the following claims. From the above discussion, many variations will be apparent to one skilled in the art that would yet be encompassed by the spirit and scope of the invention.

What is claimed is:

1. A laminate for providing thermal and electrostatic protection, comprising:

a conducting and solar energy rejecting layer comprising a semiconductor of substantially uniform thickness of approximately 500 to 2500 angstroms, said conducting and solar energy rejecting layer being transparent to a wide range of microwave frequencies for dissipating any electrostatic charges which accumulate thereon and reflecting thermal radiation; and a thermal control layer which is transparent to a wide range of microwave frequencies, attached to the conducting and solar energy rejecting layer, for reflecting thermal radiation and minimizing the effect of changes in the temperature on one side of the laminate on the region on the other side of the laminate, wherein the thermal control layer comprises a thermally reflective coating with a film layer between the conducting and solar energy rejecting layer and the thermally reflective coating for serving as a substrate for the conducting and solar energy rejecting layer and the thermally reflective coating, and wherein said thermal control layer further comprises a mesh layer.

2. The laminate of claim 1, wherein the semiconductor is geranium.

3. The laminate according to claim 1, wherein the thermally reflective coating comprises a silica-based paint.

4. The laminate according to claim 1, wherein the thermally reflective coating comprises a polyvinylfluoride film.

5. The laminate according to claim 1, wherein the film layer comprises a polyimide film.

6. The laminate according to claim 1, wherein the mesh layer is a polyamide mesh.

7. The laminate according to claim 1, wherein the mesh layer is a rigid mesh.

8. The laminate according to claim 7, wherein the rigid mesh is a polyamide mesh impregnated with epoxy and then cured.

9. The laminate according to claim 1, wherein the mesh layer comprises a polyamide fabric.

10. The laminate according to claim 9, wherein the polyamide fabric is rigid.

11. A laminate for providing thermal and electrostatic protection comprising:
a thermal insulation layer comprising a polyimide film layer having a first side and a second side, a polyamide mesh on the first side of the film layer, and a silica-based paint on the polyamide mesh; and
a layer of germanium having a uniform thickness substantially in the range of 500 to 2500 angstroms on the second side of the polyimide film layer.

12. A laminate for providing thermal and electrostatic protection comprising;
a thermal insulation layer comprising a polyimide film layer having a first side and a second side, a woven polyamide fabric impregnated with epoxy on the first side of the film layer, and a polyvinylfluoride film on the woven polyamide fabric; and
a layer of germanium having a uniform thickness substantially in the range of 500 to 2500 angstroms on the second side of the polyimide film layer.

13. The laminate of claim 1, wherein the conducting and solar energy rejecting layer is a single semiconductor layer.

* * * * *